(12) United States Patent
Matsuhashi et al.

(10) Patent No.: US 8,080,749 B2
(45) Date of Patent: Dec. 20, 2011

(54) SWITCH AND WELDING METHOD OF SAME

(75) Inventors: Hisashi Matsuhashi, Tokyo (JP); Atsuko Hildebrand, Winchester, KY (US); Anthony C. Bormes, Winchester, KY (US); Kenji Amimoto, Tokyo (JP)

(73) Assignees: Niles America Wintech, Inc., Winchester, KY (US); Niles Co., Ltd., Tokyo (JP)

( * ) Notice: Subject to any disclaimer, the term of this patent is extended or adjusted under 35 U.S.C. 154(b) by 370 days.

(21) Appl. No.: 12/379,905

(22) Filed: Mar. 4, 2009

(65) Prior Publication Data

US 2010/0224468 A1 Sep. 9, 2010

(51) Int. Cl.
*H01H 9/00* (2006.01)
*H01H 11/00* (2006.01)

(52) U.S. Cl. .................. 200/293; 29/622; 200/61.88

(58) Field of Classification Search .............. 29/622; 200/11 R–11 DA, 17 R, 18, 293, 61.85, 61.88
See application file for complete search history.

(56) References Cited

U.S. PATENT DOCUMENTS

| | | | |
|---|---|---|---|
| 6,791,043 B2* | 9/2004 | Watada et al. | 200/61.88 |
| 7,767,920 B1* | 8/2010 | Matsuhashi et al. | 200/61.88 |
| 2005/0081990 A1* | 4/2005 | Ruotsalainen | 156/272.8 |
| 2007/0209922 A1* | 9/2007 | Lima | 200/547 |
| 2007/0227866 A1* | 10/2007 | Dimig | 200/302.2 |
| 2008/0073197 A1* | 3/2008 | Saito et al. | 200/564 |
| 2008/0156626 A1* | 7/2008 | Buschmann | 200/302.2 |
| 2010/0175971 A1* | 7/2010 | Kim et al. | 200/313 |

FOREIGN PATENT DOCUMENTS

JP 2002-192617 A 7/2002

\* cited by examiner

*Primary Examiner* — Michael Friedhofer
(74) *Attorney, Agent, or Firm* — Rader, Fishman & Grauer PLLC

(57) ABSTRACT

A switch comprises a switch housing including a cover, a terminal block welded to the cover and a fixed contact point therein, a moving block provided with a boss for fitting a manual shaft of an automatic transmission and a movable contact point corresponding to the fixed contact point and movable to the switch housing and elastic seal rings interposed between inner and outer peripheral surfaces of each of the terminal block and the cover, and the operation portion. One of the cover or the terminal block is formed of a colored, laser transmissive material and the other is formed of a laser non-transmissive material. The terminal block and the cover are automatically aligned with the moving block by an elastic force of the seal ring and a thermal welding part is circularly formed by means of a laser beam on the side of the outer periphery in each of the terminal block and the cover to be aligned for coupling the terminal block with the cover to fix the alignment.

11 Claims, 4 Drawing Sheets

SWITCH AND WELDING METHOD OF SAME

BACKGROUND OF THE INVENTION

1. Field of the Invention

The present invention relates to a switch for detecting a rotational position, such as an inhibitor switch for electrically detecting a shift point of an automatic transmission, and a welding method of the switch.

2. Description of Related Art

Examples of inhibitor switches in accordance with related art are shown in cross sectional views of FIG. 5. As shown in FIG. 5, an inhibitor switch 101 is composed of a terminal block 103, a cover 105, and a moving block 107.

The terminal block 103 has a plurality of fixed contact points 109. The terminal block 103 is coupled with the cover 105 to form a switch housing 111. A contact accommodating chamber 113 is formed inside the switch housing 111. The terminal block 103 and the cover 105 are coupled in a thermal welding part 115 by, for example, ultrasonic welding.

In the thermal welding part 115, a share joint is used to ensure high welding strength. The share joint allows a circular projecting rim 119 on the side of the cover 105 to be guidably fitted all around a circular welding groove 117 on the side of the terminal block 103 at the corresponding portion of the thermal welding part 115 before thermally welded, so that the axial centers of the terminal block 103 and the cover 105 may be aligned and the axial rotation direction thereof may be positioned around the axis of the moving block 107. The terminal block 103 and the cover 105 are vibrated by means of ultrasonic waves while being pressed against each other at this positioning state. As a result, the projecting rim 119 and the welding groove 117 are thermally welded, achieving reliable ultrasonic welding.

However, at the time of aligning the terminal block 103 with the cover 105 during the ultrasonic welding process, the projecting rib 119 is required to be guided and fitted in the welding groove 117 on the entire circumference of the switch housing 111. Therefore, due to influences of a position accuracy between the welding groove 117 and the rib 119, a configuration accuracy thereof and the ultrasonic vibration, each of the terminal block 103 and the cover 105 possibly causes the alignment deviation from the axis center of the moving block 107 at a welding state. When the alignment deviation occurs, it raises the problem that the detection accuracy of the switch may deteriorate (refer to JP2002-192617A).

As described above, the conventional switch has the following problem. Since the ultrasonic welding is performed in a state where the rib is guided and fitted in the welding groove, the alignment deviation tends to occur due to influences of a position accuracy between the welding groove 117 and the rib 119, a configuration accuracy thereof and the ultrasonic vibration.

In view of the above, there exists a need for a switch and a welding method of the switch which overcome the above mentioned problems in the conventional art. The present invention addresses this need in the conventional art as well as other needs, which will become apparent to those skilled in the art from this disclosure.

SUMMARY OF THE INVENTION

The present invention is made in view of the foregoing problems and it is an object of the present invention to provide a switch for detecting a rotational position and a welding method of the switch, which can carry out an automatic alignment on assembly.

According to a first aspect of the present invention, a switch comprises a switch housing including a cover and a terminal block coupled with the cover, a moving block provided with an operation portion and movable to the switch housing, a detector for detecting a movement of the operation portion between the switch housing and the moving block and an elastic seal ring interposed between inner and outer peripheral surfaces of each of the terminal block and the cover, and the operation portion. One of the cover or the terminal block is formed of a laser transmissive material and the other is formed of a laser non-transmissive material, the terminal block and the cover are automatically aligned with the moving block by an elastic force of the seal ring, a thermal welding part is circularly formed by means of a laser beam on the side of the outer periphery in each of the terminal block and the cover for coupling the terminal block with the cover, and the terminal block and the cover are fixed at the aligned state.

According to a second aspect of the present invention, a welding method of a switch comprises a switch housing including a cover and a terminal block coupled with the cover, a moving block provided with an operation portion and movable to the switch housing, a detector for detecting a movement of the operation portion between the switch housing and the moving block and an elastic seal ring interposed between inner and outer peripheral surfaces of each of the terminal block and the cover, and the operation portion. One of the cover or the terminal block is formed of a laser transmissive material and the other is formed of a laser non-transmissive material. The welding method comprises automatically aligning the terminal block and the cover with the moving block by an elastic force of the seal ring, positioning the terminal block and the cover in the rotational direction of the moving block, irradiating a laser beam on the outer periphery side of the terminal block or the cover formed of the laser transmissive material at the positioned state, and thermally welding the terminal block and the cover in a circular shape for coupling the terminal block with the cover.

Advantage of the Invention

According to the above construction, the switch does not require the ultrasonic welding such as share joint. When the terminal block and the cover, and the moving block are assembled by interposing the elastic seal ring between the inner and outer peripheral surfaces of the fitting part therebetween, the terminal block and the cover are automatically aligned with the moving block by an elastic force of the seal ring (self-centering), and the terminal block is coupled with the cover at the thermal welding part on the outer periphery side to fix the terminal block and the cover at the aligned state.

Accordingly, by irradiating the laser beam from one of the terminal block or the cover formed of the laser transmissive metarial to the other formed of the laser non-transmissive matrial, the thermal welding can be carried out while performing the alignment accurately.

In addition, according to the above welding method, the switch does not require the ultrasonic welding such as share joint. When the terminal block and the cover, and the moving block are assembled by interposing the elastic seal ring between the inner and outer peripheral surfaces of the fitting part therebetween, the terminal block and the cover are automatically aligned with the moving block by an elastic force of the seal ring before laser welding. Accordingly, the terminal block and the cover are positioned in the rotational direction around the rotational axis center and the laser beam is irradiated from one of the terminal block or the cover formed of the laser transmissive metarial to the other formed of the laser non-transmissive matrial, so that the thermal welding can be carried out while performing the alignment accurately.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION OF THE EXAMPLE EMBODIMENTS

First Embodiment

Overall Structure of a Switch Device

Figure 1:
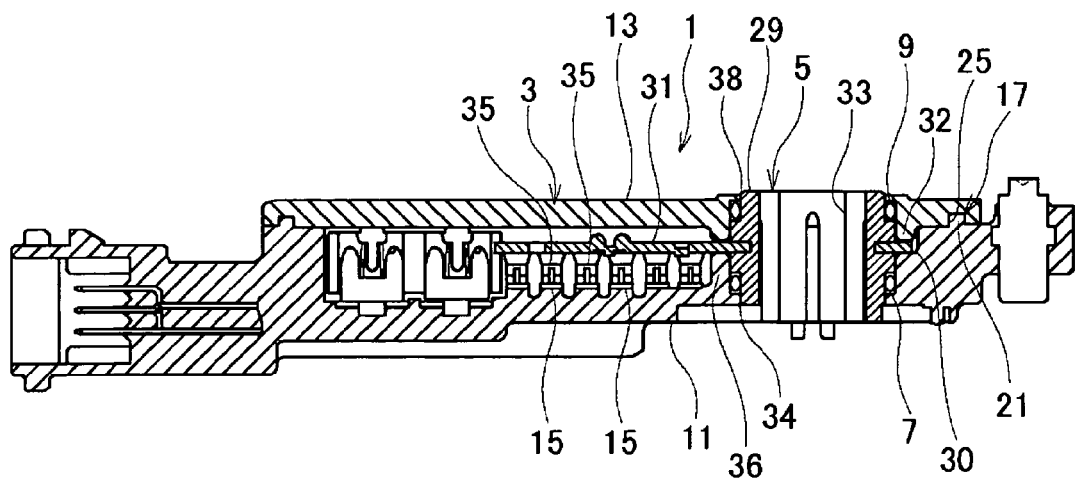
FIG. 1 is a cross sectional view showing an inhibitor switch. In a first embodiment of the present invention.
Figure 2:
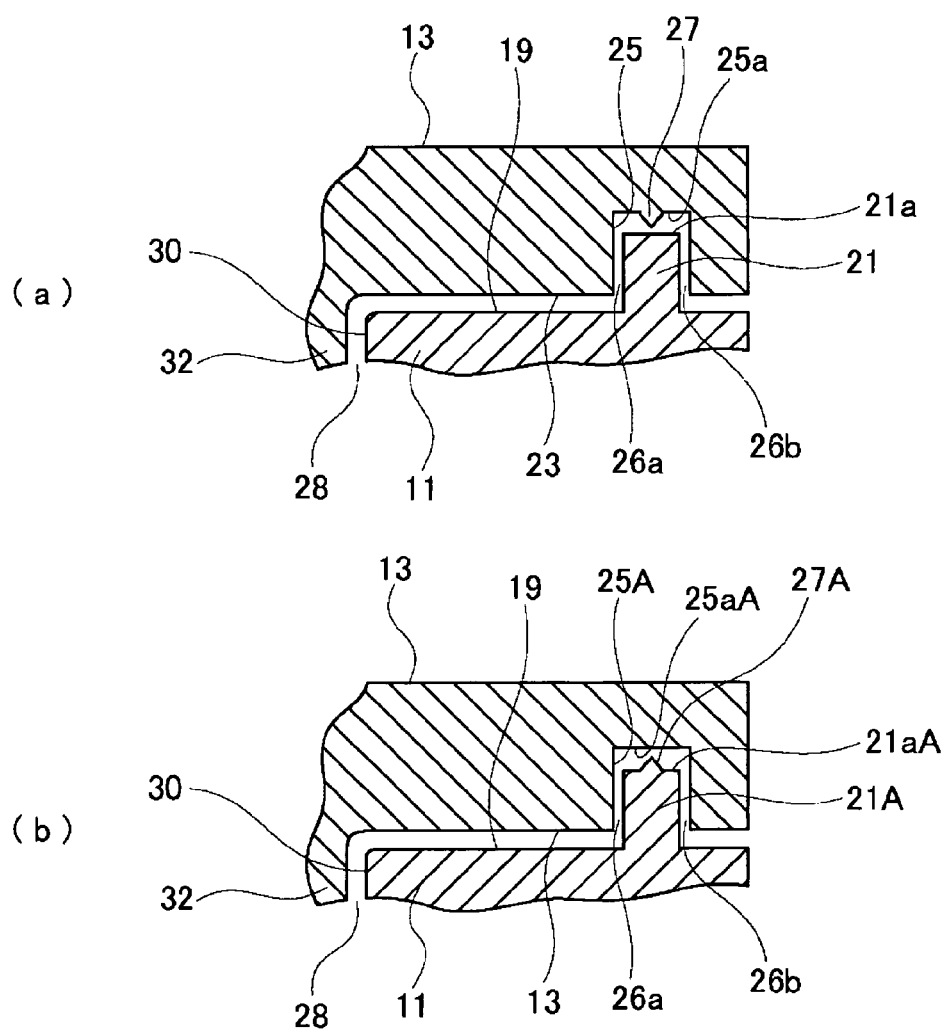
FIGS. 2(a) and 2(b) are enlarged partial views each showing a different example of a portion corresponding to a thermal welding part before welding in the first embodiment.
Figure 3:
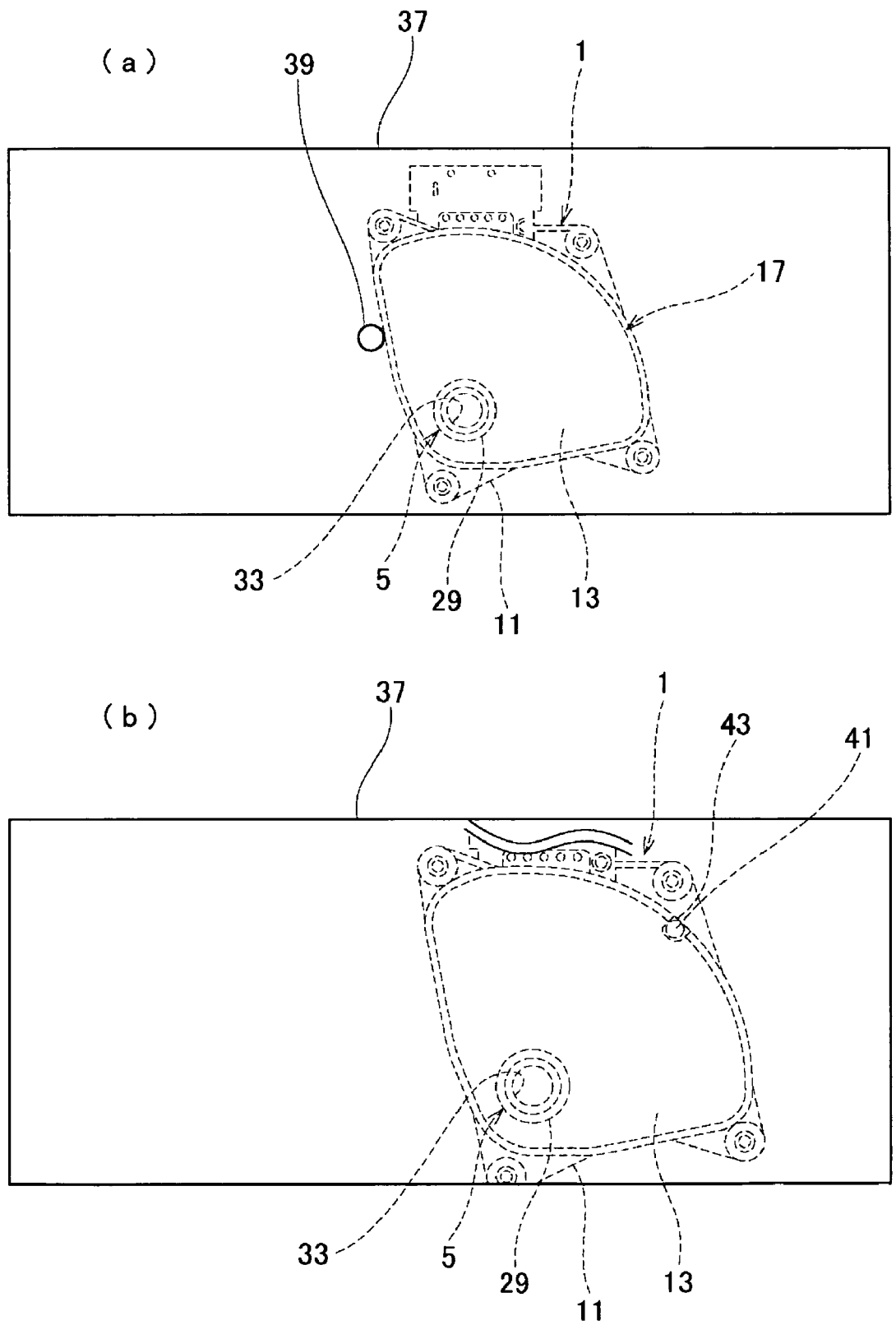
FIGS. 3(a) and 3(b) are plan views each showing a different example in regard to the positioning of a switch housing in the first embodiment.

FIG. 1 is a cross-sectional view showing an inhibitor switch in a first embodiment of the present invention. FIGS. 2(a) and 2(b) are enlarged partial cross sectional views each showing a different example before welding at a portion corresponding to a thermal welding part. FIGS. 3(a) and 3(b) are each showing a different example in regard to the positioning of a switch housing.

As shown in FIG. 1, an inhibitor switch 1, acting as a switch itself, is composed of a switch housing 3, a moving block 5, and seal rings 7 and 9.

The switch housing 3 has a terminal block 11 and a cover 13 welded therein and a plurality of fixed contact points 15 on the inside of the terminal block 11 therein as a detector.

The terminal block 11 is formed of a laser non-transmissive material. Any resin, for example nylon, is used for the laser non-transmissive material and the terminal block 11 is adapted to absorb a laser beam by adjusting a blending rate of an additive such as a black pigment to induce heat generation.

The cover 13 is formed of a colored laser transmissive material. Any resin, for example nylon, is used for the laser transmissive material and the cover 13 is adapted to absorb a laser beam by adjusting a blending rate of an additive such as a blue pigment, so that the laser beam passes through a thin part, but does not pass through any portion other than the thin part, which will be described later.

In this way, the cover 13 is blue colored while the terminal block 11 is block colored, making it possible to visually identify them definitely and thereby, in a switch assembly process, the colored cover 13 can be clearly confirmed to reliably irradiate a laser beam through the thin part to be described later. In addition, a blue pigment is added to the material of the cover 13 so as to block a visible light, making it possible for any dirt adhered over time and sparks generated inside of the switching housing 3 to be invisible from the outside.

It may be possible to form the cover 13 of a black colored material identical to that of the terminal block 11 so as for the cover 13 to be transparent or half-transparent.

The peripheries of the terminal block 11 and the cover 13 are circularly welded in a thermal welding part 17 by means of a laser beam as shown in FIGS. 1, 3(a) and 3(b).

The portion corresponding to the thermal welding part 17 is formed as shown in FIGS. 2(a) and 2(b) before welding. This means that as shown in FIG. 2(a), a flat terminal block abutting surface 19 is circularly formed on the periphery of the terminal block 11 and a projecting rib 21 is circularly formed along the terminal block abutting surface 19. On the periphery of the cover 13, a cover side abutting surface 23 is formed, and a welding groove 25 is circularly formed on the cover side abutting surface 23.

The formation of the welding groove 25 described above allows a thickness of the cover 13 to be thinly formed at the thermal welding part 17, thus enabling a laser beam to easily pass therethrough.

On an inner wall surface 25a of the welding groove 25, a welding projection 27 is circularly formed along the welding groove 25. The projecting rib 21 fits in the welding groove 25, and gaps 26a and 26b are formed between the outer periphery of the projecting rib 21 and the inner periphery of the welding groove 25 in a radial direction relative to the rotation axis of the moving block 5.

In FIG. 2(b), on a top surface 21aA of a projecting rib 21A, a welding projection 27A is formed, and an inner wall 25aA of a welding groove 25A on the cover side has a flat surface. Gaps 26a and 26b formed radially between the projecting rib 21A and the welding groove 25A are identical to those shown in FIG. 2(a).

The terminal block 11 has a circular depression 30 co-axial with the rotation axis, in which a circular projection 32 of the cover 13 fits, forming a gap 28 between the circular depression 30 and the circular projection 32 so as to move radially relative to the rotation axis of the moving block 5.

It should be noted that the projection 32 of the cover 13 serves as a holding member of a contact support plate 31 and ensures the rigidity of the region around an opening of the cover 13, and the circular depression 30 on the terminal block 11 is formed to avoid collision against the projection 32.

The moving block 5 is formed of a resin material, for example nylon, and is composed of a boss 29 of a fitting part (operation member) and the contact support plate 31. The boss 29 is rotatably supported by means of the terminal block 11 and the cover 13. The seal rings 7, 9 are attached between the inner peripheries of the terminal block 11 and the cover 13, and the outer periphery of the boss 29. The seal rings 7, 9 are formed of rubber such as an elastic O-ring. A fitting hole 33 having a double-side width is formed in the boss 29. The manual shaft (not shown) of an automatic transmission is fitted in the fitting hole 33.

Small gaps are formed between the boss 29 of the moving block 5, and a fitting bore 34 and the fitting part 36, of the terminal block 11, and further, between the boss 29, and the fitting bore 38 of the cover 13 and the cover boss 32, thus allowing a relative movement with each other in the radial direction.

The contact support plate 31 extends into the switch housing 3. On the contact support plate 31, a plurality of movable contact points 35 corresponding to the fixed contact points 15 are supported as a detector.

The fixed contact points 15 and the movable contact points 35 enable rotational transfer of the boss 29 as the operation member between the switch housing 3 and the moving block 5 to be detected.

Assembly Process

Grease is applied to the moving block 5 and the seal ring 9 is attached on the periphery of the boss 29.

The moving block 5 is built in the cover 13 and the seal ring 7 is attached on the periphery of the boss 29.

The terminal block 11 is assembled in the cover 13 coupled with the moving block 5 so that the terminal block abutting surface 19 of the terminal block 11 faces the cover abutting surface 23 of the cover 13.

At this time, when a top surface 21a, which defines a terminal block side, of the projecting rib 21 of the terminal block 11 loosely fits in the welding groove 25 of the cover 13, the welding projection 27 collides against the top surface 21a, thus forming a gap between the terminal abutting surface 19 and the cover abutting surface 23 as the welding part.

In this case, no force is added to the terminal block 11 and the cover 13 so as to automatically position the terminal block 11 and the cover 13 relative to the boss 29 of the moving block 5 by means of snapping force generated uniformly by the rubber rings 7, 9 in the radial direction on the entire circumference for self-centering.

The relative movement between the terminal block 11 and the cover 13 at automatic alignment (self-centering) is allowed by gaps 26a, 26b, 28 and the like.

The terminal block 11 and the cover 13 are positioned in their rotation direction as shown in FIGS. 3(a) and 3(b).

In FIG. 3(a), the terminal block 11 and the cover 13 are positioned in their rotation direction around the rotational axis of the moving block 5 by means of a pin 39 of a jig 37. In FIG. 3(b), the terminal block 11 and the cover 13 are positioned in their rotation direction by engaging a projection 41 extending from the terminal block 11 in a positioning groove 43 formed in the cover 13.

In this way, with the terminal block 11 and the cover 13 self-centered and positioned in their rotation direction, a laser beam is irradiated in the portion corresponding to the thermal welding part 17 on the periphery surface of the cover 13, namely the thin part of the cover 13, while pressing force being applied between the terminal block 11 and the cover 13 by means of the jig 37.

As shown in FIG. 2(a), the laser beam passes through the cover 13 to the top surface 21a of the projecting rib 21 and is absorbed therein. The absorbed laser beam heats a laser irradiating spot and the region around it, melting the top surface 21a of the projecting rib 21. Melting heat in the top surface 21a of the projecting rib 21 is transferred to the welding projection 27 of the welding groove 25, further melting the welding projection 27.

In FIG. 2(b), the welding projection 27A and the region around it are melted, by heating and the heat is transferred to the internal surface 25aA of the welding groove 25A from the welding projection 27 for further melting.

During this melting step, a gap formed between the terminal block abutting surface 19 and the cover abutting surface 23 is filled up and at the same time, the laser beam moves to the next welding point by a constant velocity motion along the portion corresponding to the thermal welding part 17 of the laser irradiating spot, while the temperature of the previously welded part drops and the hardening begins.

In this way, the thermal welding part 17 is formed on the entire circumference of the switch housing 3 by the laser beam, fixing the automatic alignment (self-centering).

Effects of First Embodiment

The inhibitor switch 1 in the first embodiment of the present invention is compose of the switch housing 3 including the terminal block 11, the cover 13 coupled with the terminal block 11 and the plurality of fixed contact points 15 formed therein; the moving block 5, which is rotatable relative to the switch housing 3 and has the boss 29 for fitting the manual shaft of the automatic transmission and the plurality of movable contact points 35 corresponding to the plurality of fixed contact points 15, and elastic seal rings 7, 9 interposed between the inner and outer peripheral surfaces of each of the terminal block 11 and the cover 13, and the boss 29. The cover 13 is formed of a colored laser transmissive material while the terminal block 11 is formed of a laser non-transmissive material. The thermal welding part 17 is circularly formed by means of a laser beam on the side of the outer periphery in each of the terminal block 11 and the cover 13 which are automatically aligned with the moving block 5 by an elastic force of the seal rings 7, 9 for coupling the terminal block 11 with the cover 13, and the terminal block 11 and the cover 13 are fixed at the aligned state.

Therefore, contact between the projecting rib and the groove as in the case of the share joint is not necessary. When the elastic seal rings 7, 9 are interposed between the inner and outer peripheral surfaces of each of the terminal block 11 and the cover 13, and the boss 29 of the moving block 5 on assembly, the terminal block 11 and the cover 13 are automatically aligned with the boss 29 of the moving block 5 by an elastic force of the seal rings 7, 9 (self-centering), and the terminal block 11 is coupled with the cover 13 at the thermal welding part 17 on the outer periphery side by a laser beam to fix the terminal block and the cover at the aligned state. In addition, since the vibration is not applied to the terminal block 11 and the cover 13 by laser welding, there occurs no generation of a position deviation due to the vibration.

A compression amount of each of the seal rings 7, 9 is uniformed on the entire circumference, facilitating more stable sealing performance.

Figure 4:
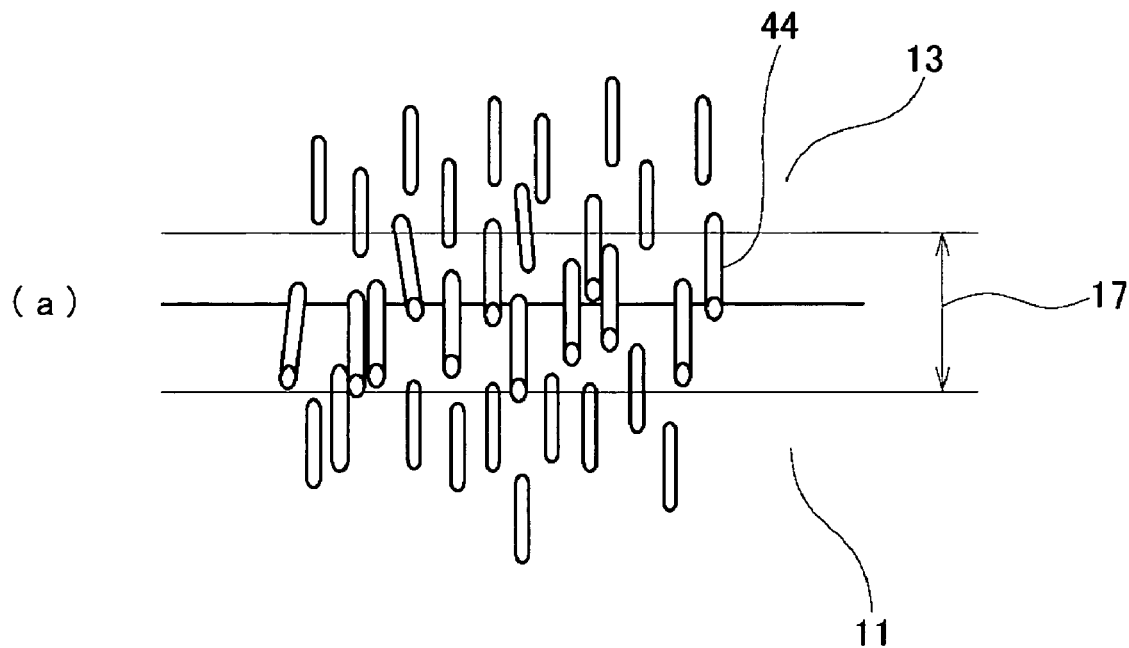
FIG. 4(a) is an explanatory diagram showing a state of glass fibers in regard to laser welding.
FIG. 4(b) is an explanatory diagram showing a state of glass fibers in regard to ultrasonic welding.
Figure 4:
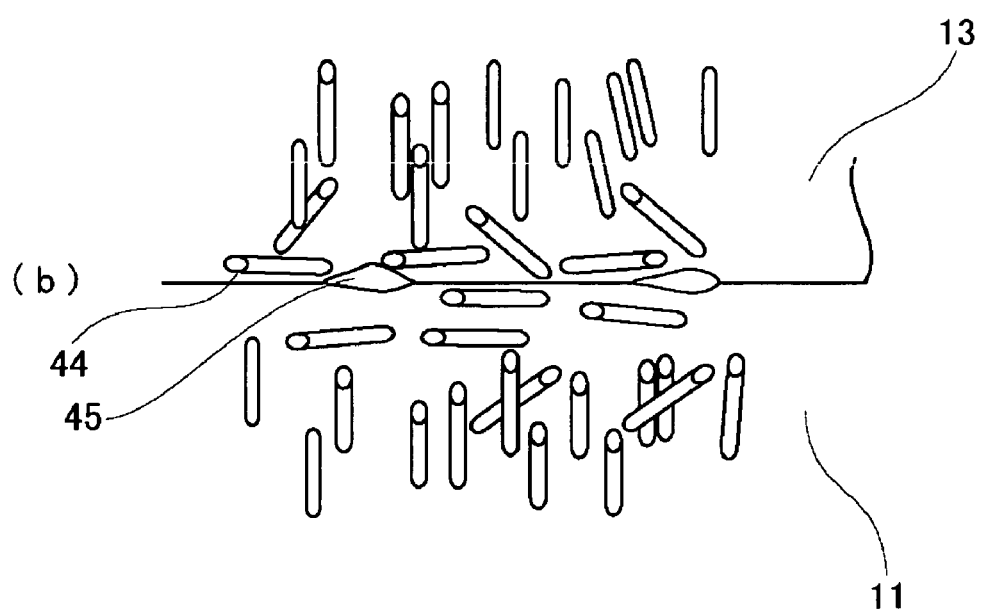
Figure 5:
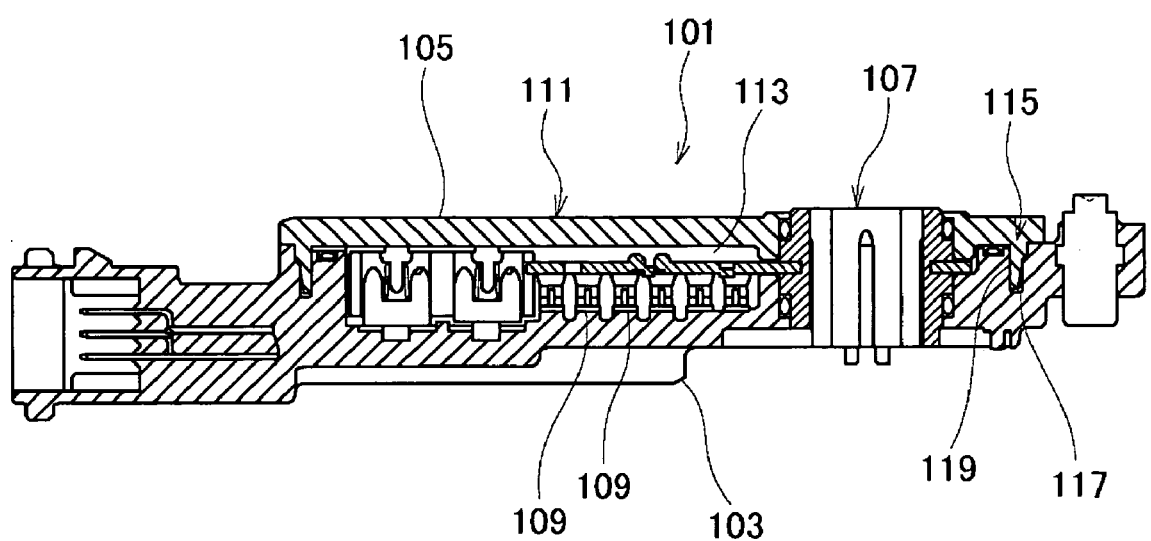
FIG. 5 is a cross sectional view showing an inhibitor switch in the conventional art.

As shown in FIG. 4(a), the thermal welding part 17 between the terminal block 11 and the cover 13 is not vibrated even when glass fibers 44 are contained in the resin materials in the terminal block 11 and the cover 13, and thereby, the glass fibers 44 are kept in their original states to be difficult to lie in parallel to the welding surface. Accordingly, even in a case of containing the glass fibers in the resins, there does not occur the problem as shown in FIG. 4(b) that the gap is left after being welded and hardened as in the case of the ultrasonic welding process. In consequence, the welding can be reliably performed on the entire circumference. In addition, seals can be omitted from between the terminal block 11 and the cover 13.

By means of, moreover, the welding projections 27,27a, pressing pressure can be intensively applied to the melting part and also while the welding part can be ensured for more reliable thermal welding.

Unlike ultrasonic welding, in the welding method of the present embodiment, the gap is formed between the welding groove 25 and the projecting rib 21, and the terminal block 11 and the cover 13 are not positioned directly using the welding groove 25 and the projecting rib 21 in the rotation direction of the moving block 5, therefore, making it possible to facilitate the assembly operation.

The thickness of the cover 13 at the thermal welding part 17 can be made relatively thinner due to the welding groove 25 and the projecting rib 21 as compared to the other part of the cover 13.

Therefore, additives such as blue pigments as the material of the cover 13 are increased in amounts to ensure the laser transmissive rate at the thermal welding part 17 while deepening the color. In consequence, the welding is performed by the laser beam and at the same time, the deep color of the cover 13 can hide dirt inside the cover 13 changing over time and makes sparks inside the cover 13 invisible from a user.

On the other hand, according to the welding method in the present embodiment, the inhibitor switch 1 is composed of the switch housing 3 including the terminal block 11, the cover 13 coupled with the terminal block 11 and the plurality of fixed contact points 15 formed therein; the moving block 5, which is rotatable relative to the switch housing 3 and has the boss 29 for fitting the manual shaft of the automatic transmission and the plurality of movable contact points 35 corresponding to the plurality of fixed contact points 15, and elastic seal rings 7, 9 interposed between the inner and outer peripheral surfaces of each of the terminal block 11 and the cover 13, and the boss 29. The cover 13 is formed of a colored laser transmissive material while the terminal block 11 is formed of a laser non-transmissive material. The terminal block 11 and the cover 13 are positioned in the rotational direction of the moving block 5 and at the positioned state the laser beam is irradiated on the outer periphery side of the cover formed of the laser transmissive material to thermally weld the terminal block 11 and the cover 13 in a circular shape.

Therefore, the ultrasonic welding as in the case of the share joint is not necessary. When the elastic seal rings 7, 9 are interposed between the inner and outer peripheral surfaces of each of the terminal block 11 and the cover 13, and the boss 29 of the moving block 5 on assembly, the terminal block 11 and the cover 13 are automatically aligned with the boss 29 of the moving block 5 by an elastic force of the seal rings 7, 9.

In consequence, the terminal block 11 and the cover 13 are positioned in the rotational direction of the moving block 5 and at the positioned state the laser beam is irradiated from the cover 13 formed of the laser transmissive material to the terminal block 11 formed of the laser non-transmissive material whereby the thermal welding can be carried out at a state where the positioning in the rotational direction and the self-centering of the terminal block 11 and the cover 13 are accurately performed.

The positioning in the rotational direction is made by engagement between a positioning pin 39 disposed in a jig or a projection 41 disposed in the terminal block 11 and a concave part 43 formed in the cover 13.

Therefore, the positioning in the rotational direction can be securely and easily made, apart from the self-centering without contact between the projecting rim and the groove such as the conventional share joint.

It should be noted that the inhibitor switch is used in the explanation of the above embodiment, but another rotational position detecting switch may be applied. In the case of the inhibitor switch, it is attached inside or outside an automatic transmission of an automobile. When the inhibitor switch is attached inside the automatic transmission, it is exposed to oil in the automatic transmission or the like and when it is attached outside the automatic transmission, it is exposed to muddy water or the like. Since the inhibitor switch is used in such a harsh environment, a seal ring is required between a fixed part such as the switch housing and the moving block transmitting the motion of the manual valve shaft and a function of the seal ring can be sufficiently achieved and also the feature can be effectively used.

Other Embodiments

The terminal block may be formed of a laser transmissive material and the cover 13 may be formed of a laser non-transmissive material.

If an outer peripheral edge of the cover 13 or the terminal block 11 formed of a laser transmissive material allows sufficient laser transmission, it is not necessary to formed to be thinner than the other part particularly.

The welding projections 27 may be formed in plurality and they may be omitted.

In each of the embodiments, a detector composed of fixed contact points and movable contact points is exemplified. However, the embodiment may be likewise applied to a switch having a non-contact detector formed of a combination of a magnet and a magnetic sensor or a light emitting element and a light receiving element.

While only the selected embodiments have been chosen to illustrate the present invention, it will be apparent to those skilled in the art from this disclosure that various changes and modifications can be made therein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A switch comprising:
a switch housing including a cover and a terminal block coupled with the cover;
a moving block provided with an operation portion and movable to the switch housing, gaps are formed between the operation portion of the moving block and the terminal block, and the cover to allow a relative movement with each other between inner and outer peripheral surfaces of each of the terminal block and the cover, and the operation portion;
a detector for detecting a movement of the operation portion between the switch housing and the moving block; and
an elastic seal ring interposed between inner and outer peripheral surfaces of each of the terminal block and the cover, and the operation portion, wherein:
one of the cover or the terminal block is formed of a laser transmissive material and the other is formed of a laser non-transmissive material;
the terminal block and the cover are automatically aligned with the moving block by an elastic force of the seal ring; and
a thermal welding part is circularly formed by means of a laser beam on the side of the outer periphery in each of the terminal block and the cover to be aligned for coupling the terminal block with the cover to fix the alignment.

2. The switch according to claim 1, wherein:
the switch includes an inhibitor switch for detecting a shift position of an automatic transmission; and
a rotational body fitted in a fitting bore formed in the operation portion includes a manual shaft of the automatic transmission.

3. The switch according to claim 1, wherein:
one of the cover or the terminal block has a circular projection, and
the other of the cover or the terminal block has a circular depression co-axial with a rotation axis of the moving block, in which the circular projection fits, forming a gap between the circular depression and the circular projection so as to move radially relative to the rotation axis.

4. The switch according to claim 1, wherein:
a projecting rib is circularly formed along the one of the cover or the terminal block formed of a laser non-transmissive material, a welding groove is circularly formed on the other of the cover or the terminal block formed of a laser transmissive material, the projecting rib fits in the welding groove, and gaps are formed between the projecting rib and the welding groove in a radial direction relative to the rotation axis of the moving block.

5. A welding method of a switch provided with:

a switch housing including a cover and a terminal block coupled with the cover;

a moving block provided with an operation portion and movable to the switch housing, gaps are formed between the operation portion of the moving block and the terminal block, and the cover to allow a relative movement with each other between inner and outer peripheral surfaces of each of the terminal block and the cover, and the operation portion;

a detector for detecting a movement of the operation portion between the switch housing and the moving block; and an elastic seal ring interposed between inner and outer peripheral surfaces of each of the terminal block and the cover, and the operation portion, wherein one of the cover or the terminal block is formed of a laser transmissive material and the other is formed of a laser non-transmissive material, comprising:

automatically aligning the terminal block and the cover with the moving block by an elastic force of the seal ring;

positioning the terminal block and the cover in the rotational direction of the moving block; and irradiating a laser beam on the side of the outer periphery of the terminal block or the cover to thermally weld the terminal block and the cover in a circular shape.

6. The welding method of the switch according to claim 5, wherein:

the positioning in the rotational direction is made by a positioning pin disposed in a jig.

7. The welding method of the switch according to claim 6, wherein:

the switch includes an inhibitor switch for detecting a shift point of an automatic transmission; and a rotational body fitted in a fitting bore formed in the operation portion includes a manual shaft of the automatic transmission.

8. The welding method of the switch according to claim 5, wherein:

the positioning in the rotational direction is made by engagement between a projection disposed in one of the terminal block and the cover and a concave part formed in the other.

9. The welding method of the switch according to claim 8, wherein:

the switch includes an inhibitor switch for detecting a shift point of an automatic transmission; and a rotational body fitted in a fitting bore formed in the operation portion includes a manual shaft of the automatic transmission.

10. The welding method of the switch according to claim 5, wherein:

the switch includes an inhibitor switch for detecting a shift point of an automatic transmission; and a rotational body fitted in a fitting bore formed in the operation portion includes a manual shaft of the automatic transmission.

11. An inhibitor switch for detecting a shift position of an automatic transmission comprising:

a switch housing including a cover and a terminal block coupled with the cover, one of the cover or the terminal block is formed of a laser transmissive material and the other is formed of a laser non-transmissive material;

a moving block provided with an operation portion and movable to the switch housing, gaps are formed between the operation portion of the moving block and the terminal block, and the cover to allow a relative movement with each other between inner and outer peripheral surfaces of each of the terminal block and the cover, and the operation portion, one of the cover or the terminal block formed of a laser transmissive material has a circular projection, and the other of the cover or the terminal block formed of a laser non-transmissive material has a circular depression co-axial with a rotation axis of the moving block, in which the circular projection fits, forming a gap between the circular depression and the circular projection so as to move radially relative to the rotation axis of the moving block;

a projecting rib is circularly formed along the one of the cover or the terminal block formed of a laser non-transmissive material;

a welding groove is circularly formed on the other of the cover or the terminal block formed of a laser transmissive material, the projecting rib fits in the welding groove, and gaps are formed between the projecting rib and the welding groove in a radial direction relative to the rotation axis of the moving block;

a detector for detecting a movement of the operation portion between the switch housing and the moving block; and an elastic seal ring interposed between inner and outer peripheral surfaces of each of the terminal block and the cover, and the operation portion, wherein:

the terminal block and the cover are automatically aligned with the moving block by an elastic force of the seal ring; and a thermal welding part is circularly formed by means of a laser beam on the side of the outer periphery in each of the terminal block and the cover to be aligned for coupling the terminal block with the cover to fix the alignment.

* * * * *